Jan. 12, 1943.    J. SLEPIAN    2,307,750
ELECTRIC HEATING OF METAL ROD ENDS
Original Filed April 15, 1941
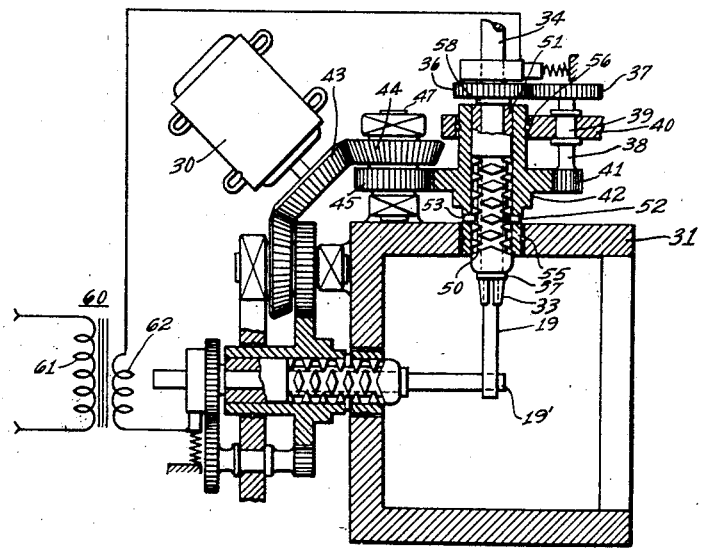
WITNESSES:
C. J. Weller.
Rev. C. Groome
INVENTOR
Joseph Slepian.
BY
F. W. Lyle.
ATTORNEY Patented Jan. 12, 1943

2,307,750

UNITED STATES PATENT OFFICE 2,307,750

ELECTRIC HEATING OF METAL ROD ENDS

Joseph Slepian, Pittsburgh, Pa., assignor to Westinghouse Electric & Manufacturing Company, East Pittsburgh, Pa., a corporation of Pennsylvania Original application April 15, 1941, Serial No. 388,621. Divided and this application June 17, 1942, Serial No. 447,375

3 Claims. (Cl. 219—11)

This invention relates to rapid heating of metallic parts required in the manufacture of various equipments. More particularly, the invention relates to the rapid heating of rods or like material by means of an electric arc discharge, or by electric current flowing across poor contacts between conductors.

This application is a division of my copending application Serial No. 388,621, filed April 15, 1941, for Electric heating of metal rod ends, assigned to Westinghouse Electric & Manufacturing Company.

In the manufacture of different kinds of equipment, machinery and other products, it is often necessary to raise the temperature of certain metallic parts to a very high degree in order to prepare these parts for further manufacturing operations or for the heat treatment necessary in hardening processes. In the present state of mass production of different devices, it is desirable to effect the heating of certain component parts very rapidly in quick succession so as to produce a great number of these parts in a short time. The methods heretofore proposed lack the necessary speed of operation, or the apparatus available for the heating requires a considerable expenditure of energy to produce the thermal effect within prescribed time limits. As an example, in the manufacture of internal combustion engines, the valve-stems must undergo a hardening operation which involves the heating of these stems to a high temperature. The heating process employed must be capable of heating these stems uniformly and in the methods heretofore known the production rate is generally slowed down due to the time required to bring the valve stems up to the specified temperature.

The particular feature of this invention is that the uniform heating of metallic rods, such, for example, as valve stems, may be effected in an exceedingly short time with the minimum expenditure of energy required.

A further advantage of the invention is the simplicity of structural assembly of the apparatus particularly adaptable for production work.

Another feature of the invention is that the heating effect of an electrical current is utilized in such manner that by current conductive contact, the entire surface of the rods to be heated will be exposed to the thermal effect, and the heat will be uniformly distributed in the metallic substance.

Other objects and advantages will be apparent from the following description of the invention, pointed out in particularity by the appended claims, and taken in connection with the accompanying drawing, in which the single figure shows a modification of the invention utilizing the current conductivity and contact between the objects to be heated.

Referring to the drawing, the apparatus contemplates a direct heating effect of the current by actual contact between two rods 19 and 19'. In order to distribute the heat developed at the point of contact between the rods, certain means must be provided for rapidly rotating each rod, and at the same time moving them in the direction of their longitudinal axes. In this manner, the overall surface of the rods will in rapid succession be covered in electrical contact with another rod revolving and moving in the same manner. To this end, there is shown in the drawing by way of example an assembly of gear trains which when turned by the motor 30 will cause the rotation and the movement of the rods above described. The mechanical elements herein shown to perform this function are merely for the purpose of illustrating an operative arrangement. Various other means may be devised by those skilled in the art to obtain the required movements of the rods.

The apparatus comprises a suitable frame 31 shown here in cross-section which supports two identical assemblies for the driving of the rods 19 and 19'. Similar parts in the two assemblies will be denoted with identical reference characters with primary indices in the second assembly. The rod 19 is held by a chuck 33 which is affixed to a shaft 34. The latter is coupled to the gear 36 in such manner that it will cause rotation of the shaft 34 while allowing axial displacement thereof in the downward and upward directions. The gear 36 is driven by the gear 37 coupled to the shaft 38 which runs in a suitable bearing 39 housed in a support 40. The shaft 39 is driven by gear 41, which in turn is coupled to the main driving gear 42. The motor 30 is coupled to the main driving gear 42 by means of gears 43, 44 and 45. The driving gears 44 and 45 are supported by the frame 31 and turn on the shaft 47. The elements so far described effect the rotary motion of the shaft 34. The rectilinear reciprocal motion thereof is obtained by means of the reentrant double screw threads 50 which are cut into the sleeve 51 and are engaged by pins 52 and 53 driven into the hub of the main driving gear 52. The latter runs in the ball bearings 55 and 56 housed in the frame 31 and in the support 40 respectively. The sleeve 51 abuts against the shoulder 57 which is secured to the shaft 34, and thereby causes its downward motion until the pins 52 slide into the return slots of the sleeve 51, whereupon the shoulder 53 similarly secured to the shaft 34 abuts against the sleeve 51 and the shaft is returned to its starting position. By the continuous turning of the motor, this operation is repeated in successive order. The rods 19 turn at a comparatively high rate of speed, whereas the reciprocating action of the sleeve 51 moves the rods in an axial direction forward and backward.

The mechanism which moves the rod 19' is the same as the one just described, and need not be repeated here. Each element performs the same function as the corresponding element in the assembly, and reference thereto may be had by the same reference character bearing a primary index.

The electrical energy for passing a current through the rods is shown here, by way of example, in the form of a transformer 60 having a primary winding 61 which may be supplied from a commercial alternating current power line. The secondary winding 62 is so proportioned as to supply the required voltage for producing the heating current between the rods 19 and 19'. The contact drop between rods to be used for valves in internal combustion engines is calculated to be approximately 1 volt, and the power output of the secondary winding 62 about 5 kilowatts which would produce a heating current of 5000 amperes through the rods 19 and 19'. The alternating current source may be replaced by a direct current source with equal results.

I claim as my invention:

1. The method of rapidly raising the temperature of metallic rods or similar materials which comprises, utilizing two of said rods as oppositely charged electrodes in electrical contact with each other, rotating said electrodes and simultaneously causing uniform reciprocating rectilinear motion of both said electrodes whereby said contact is uniformly distributed over the surfaces of both said electrodes within a predetermined time.

2. In an apparatus for the rapid heating of metal rods or the like, a pair of holders each of which accommodates a rod to be heated, said holders being displaced at an angle whereby the longitudinal axes of said rods are substantially perpendicular and said rods in physical contact, means for rotating said rods and simultaneously moving them in uniform reciprocating rectilinear motion in the direction of their longitudinal axes whereby the point of contact between said rods is in rapid succession evenly distributed over the entire surface of said rods, a source of electric current, circuit means for causing said current to flow through said rods at the point of instantaneous physical contact therebetween, said current being of such magnitude as to produce a thermal effect for the intense heating of said rods.

3. In an apparatus for the rapid heating of metal rods or the like, a pair of holders in which a rod may be inserted so as to extend therefrom over a large portion of its entire length, each of said holders comprising a rotating shaft in a bearing, a sleeve for said shaft, means for moving said sleeve in the direction of the longitudinal axis of said shaft in reciprocal motion, gear means for simultaneously effecting rotation of both said shafts and reciprocal moton thereof in the direction stated, a motor for moving said gears, said holders being displaced longitudinally at an angle whereby the longitudinal axes of said rods are substantially perpendicular and said rods are in physical contact one above the other, a source of electrical current, circuit means for causing said current to flow through said rods at the point of contact, said current being of such magnitude as to produce a thermal effect for the intense heating of said rods.

JOSEPH SLEPIAN.